Dec. 11, 1923.
H. Z. COBB
1,477,108
GANG CUTTER FOR SHEET STOCK
Filed April 29, 1920
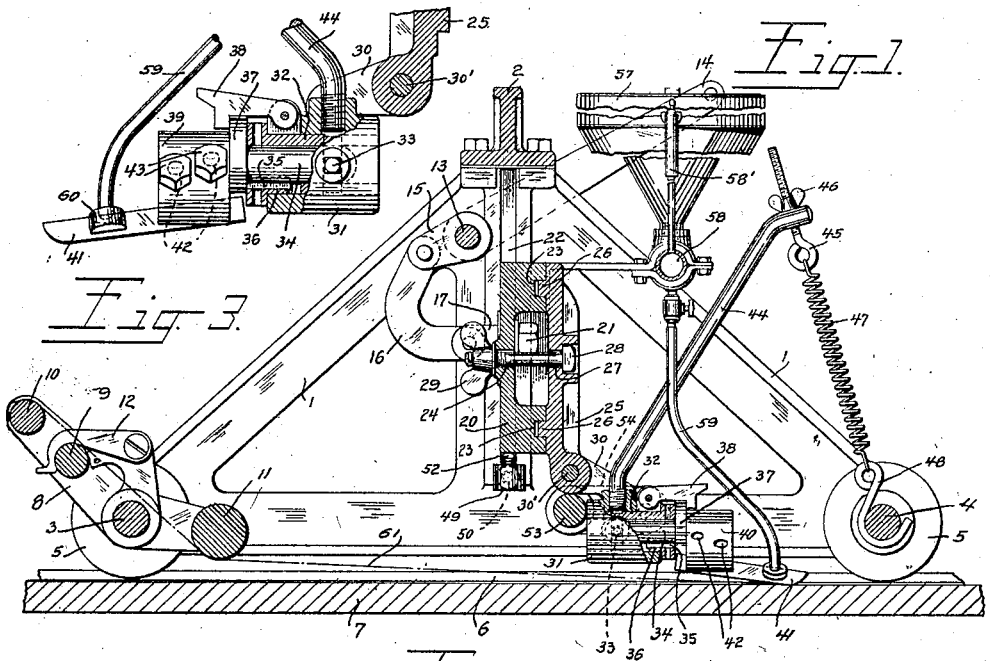
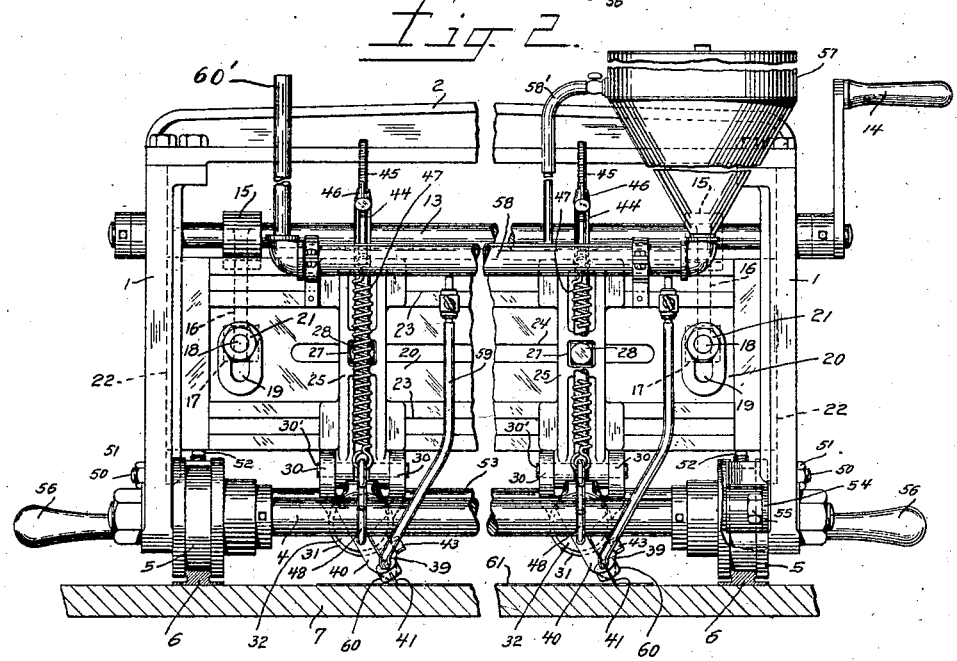
Inventor.
Henry Z. Cobb.
By his Attorney
Ernest Hopkinson Patented Dec. 11, 1923.

1,477,108

UNITED STATES PATENT OFFICE.

HENRY Z. COBB, OF NEW YORK, N. Y., ASSIGNOR TO NEW YORK BELTING AND PACKING COMPANY, A CORPORATION OF NEW YORK.

GANG CUTTER FOR SHEET STOCK.

Application filed April 29, 1920. Serial No. 377,513.

*To all whom it may concern:*

Be it known that I, HENRY Z. COBB, a citizen of the United States, residing at New York, county of New York, and State of New York, have invented a new and useful Gang Cutter for Sheet Stock, of which the following is a full, clear, and exact description.

This invention relates to a gang cutter for sheet rubber stock and similar material, and more particularly to a cutter for sheet stock used in air brake and fire hose.

The underwriter's requirements are very strict in respect to hose of the above type and in some cases will permit only of the use of hose made from calendered sheet stock as distinguished from die formed tubing, as the latter lacks the toughness and uniformity of calendered sheet stock. The stock is cut into strips with skived edges, the edges being then lapped and joined under pressure to form a tube. It is desirable in forming such tubes to omit the use of cement and make the joint merely by pressing together the freshly cut edges of the stock. However, in order to form a good joint it is essential that the edges be perfectly smooth and free from any roughness or irregularities, and such a skived edge is best produced by the use of a draw cut.

Previous to my invention it has been customary to manually cut one piece at a time from the stock, which is a slow and laborious method. In performing this operation the cutting lines are marked out on the stock with chalk and the operator then runs a knife along the marked lines, holding the knife inclined to produce a skive and draw cut. This requires considerable skill to accurately follow the lines with any speed, and at best is a comparatively slow means for attaining the desired result. In addition the chalk on the cut edges of the strip causes defective joints when the skived edges are overlapped in forming a tube.

An object of my invention is to provide a simple and effective means for rapidly and accurately cutting sheet stock into strips.

Another object is to provide means for cutting sheet stock into strips having skived edges.

A further object is to provide means whereby the angle of the skive may be varied.

A further object is to provide readily adjustable means for cutting sheet stock into strips of any desired width.

Briefly, the invention comprises a carriage adapted to be moved over a work bed or table upon which the material to be cut is supported, said carriage being provided with a plurality of cutting means adapted to be moved to or from cutting relation with the stock.

For a full disclosure of the invention reference is had to the detailed description and claims.

In the drawings, Fig. 1 is a vertical sectional view through the machine.

Fig. 2 is a front elevation with parts omitted and others broken away.

Fig. 3 is a detail view of one of the cutting devices.

Referring to the drawings there is shown a carriage comprising triangular side frames 1 connected by a brace bar 2 at the top. Shafts 3 and 4 extend between the frames at the ends of their bases and carry grooved wheels 5 adjacent the frames, which wheels are adapted to run on tracks 6 mounted on the table or work bed 7.

Mounted on the shaft 3 are a pair of rocker frames 8 connected by a brace bar 9, the ends of the rocker frames carrying rollers 10 and 11 journaled therein. The rocker frames and associated rollers are held in operative position by a pivoted latch 12 adapted to engage the brace bar 9.

Journaled in the frames 1 near their upper portion is a rock shaft 13, one end of which carries outside of the frames an operating crank handle 14. Rigidly connected to the rock shaft 13 are rock arms 15, in the present instance two in number, to each of which is pivotally connected a curved link 16, each link being in turn pivotally connected at its other end to an attaching member 17 having a threaded extension 18. The threaded extensions 18 are adapted to enter vertical slots 19 in a cross bar 20 extending between the frames 1, and are adjustably connected to the cross bar 20 by means of nuts 21 engaging the extensions. The ends of the cross bar 20 are slidably engaged in vertical grooves 22 in the frames 1.

A plurality of cutting devices are adjustably connected to the cross bar 20 in the following manner: The cross bar is provided with spaced horizontal grooves 23 and a horizontal slot 24. Each cutting device comprises an attaching and supporting member 25 provided with lugs 26 adapted to engage in the grooves 23 of the cross bar, and a bolt hole 27 which is disposed in alignment with the slot 24 when the lugs 26 engage the grooves 23. A bolt 28 passes through the hole 27 and slot 24 and a wing-nut 29 threaded to the bolt holds the attaching member 25 in adjusted position on the cross bar 20. A pair of yokes 30 extending from a socket member 31 are pivotally connected to the attaching member 25 at 30', and a bearing sleeve 32 rotatable in the socket member 31 is held in adjusted position therein by means of a set screw 33. Slidably fitting in the bearing sleeve 32 is a shank 34 of a knife clamp member, said shank being prevented from turning in said sleeve by a key 35 slidable in a keyway 36 in the sleeve. Extending from the shank of the clamp member is a flange 37 with which a pivoted latch 38 is adapted to engage to hold the clamp member in the bearing sleeve. The clamp member comprises two sections 39 and 40, between which the cutter blade 41 is removably and adjustably held by means of bolts 42 and nuts 43. Extending from the top of the sleeve 31 is a bent rod 44, through an opening in the end of which passes a small eye-bolt 45 having an adjusting wing-nut 46 threaded thereon, and connected to the eye-bolt is a spring 47 to the other end of which is connected a hook 48 adapted to be engaged with the shaft 4. Supported by each side frame 1 is a stop member 49 for the cross bar 20; said stop member being secured to the frame by a threaded extension 50 and nut 51. Extending vertically from each stop member is an adjustable stop screw 52 adapted to contact with the cross bar 20 and limit its downward movement. A stop bar 53 also extends between the frames 1 in the rear of the socket members 31, said stop bar being supported on the frames 1 by arms 54 at its ends secured to the frames by nuts 55.

In order to move the carriage on its tracks handles 56 are connected to each side thereof.

In cutting rubber, and particularly in cutting high-grade stock it is desirable to have some means for moistening the cutting device. To this end a water reservoir 57 is mounted on the cross piece 20 and an outlet manifold 58 extending between the frames 1 is in communication with the reservoir by means of the pipe 58'. Leading from this manifold are a plurality of valve-controlled flexible tubes 59 connected to water discharge means 60 having slots adapted to fit on the blades 41 and through which slots the water is discharged. At the end opposite the reservoir 57 the manifold 58 is provided with a vent pipe 60'.

In operation the end of a sheet of stock 61 is passed over the roller 10 and under the roller 11 to a point below the cutting devices. The hook 48 of each cutting device is connected to the shaft 4, and the crank 14 is operated to lower the cross bar 20, thereby lowering the cutting devices until the blades 41 come in contact with the stock 61 on the bed 7. The carriage is then drawn along the work bed and the blades 41 cut the stock into strips of a width depending upon their spacing. By means of the rollers 10 and 11 the stock is placed under a slight tension in advance of the blades, thereby preventing any buckling or distortion of the stock in front of the blades, and owing to the inclination of the blade edges with respect to the line of cut a clean draw cut closely approximating that produced by hand is obtained.

It will be seen that by my construction numerous adjustments are provided for varying the cutting action according to conditions. By means of the clamp sections 49 and 40 the length of the free end of the blade may be varied as also the length of its cutting edge in contact with the stock, and the angle of the edge may be changed to vary the draw cut with different stocks and different thicknesses of the sheet. By means of the rotatable bearing sleeve 32 of the clamp device and its set-screw 33 the angle of the skive cut may be varied. By adjusting the tension of the spring 47 by the wing-nut 46 the cutting pressure of the blade on the stock may be varied according to the thickness and quality thereof. By means of the bolts 28 and wing-nuts 29 any desired transverse spacing of the blades may be obtained. By means of the adjustable connection between the links 16 and cross bar 20 the points of maximum and minimum elevation of the cross bar and its supported cutting devices as a whole may be simultaneously varied. By adjustment of the screws 52 the point of depression of the cutting devices as a whole may be limited. And finally, by adjustment of the stop bar 53 on its mounting the limit of downward movement of the cutters on their pivots 30' may be varied.

By reference to Fig. 2 the inclination of the blades 41 to produce a skive cut is clearly shown, and when pressure is put upon the blade by the spring 47 the free end of the inclined blade in engagement with the stock is slightly distorted or twisted to increase the angle of the cut.

By my machine the stock is rapidly and accurately cut into strips of any desired width and skive cut in a manner closely simulating that used when the stock is cut manually, but without any of its disadvantages.

Having thus described my invention what I claim and desire to protect by Letters Patent is:

1. In a cutter for flexible sheet stock, a bed on which the stock is supported in stationary relation, means for cutting the stock into longitudinal strips, means for varying the angle of the cut edge of the strips with respect to the bed, means for relatively moving the cutting means and bed, and means for preventing buckling of the stock in advance of the cutting means.

2. In a cutter for sheet stock, a cutting blade, means for supporting said blade in operative relation to the sheet of stock, means for varying the cutting angle of the blade both with respect to the line of cut and laterally, and means whereby the blade and sheet may be relatively moved.

3. In a cutter for sheet stock, a support, a blade pivotally carried thereby, means for adjusting the blade laterally and longitudinally, means for moving the support into either operative or inoperative relation to the sheet of stock, means for exerting pressure on the blade, and means whereby the support and sheet may be relatively moved to cut the sheet.

4. In a cutter for sheet rubber stock, an imperforate bed for the stock, means movable thereon including a plurality of knives cooperating therewith for simultaneously cutting the stock into parallel strips with skived edges, and means for varying the length of cutting edge of said knives in contact with the stock.

5. In a cutter for sheet rubber stock, an imperforate bed, means coacting therewith for simultaneously cutting a sheet of stock into a plurality of skived edge strips, means for varying the cutting angle of the edge of said means and the pressure of said edge, and means whereby the width of the strips may be varied.

6. In a cutter for sheet stock, means for simultaneously cutting a sheet of stock into parallel strips with skived edges, means for varying the angle of the skive, means for resiliently maintaining the cutting means in contact with the stock, and means for varying the pressure of the cutting means on the stock.

7. In a cutter for sheet rubber stock, a plurality of edged means for cutting a sheet of stock into parallel strips with skived edges, an imperforate bed coacting therewith, means for varying the angle of the skive, and adjustable means for simultaneously moving the cutting means to and from operative position.

8. In a cutter for sheet stock, a plurality of cutter blades, means for giving each blade an angular movement in two directions with respect to the stock, means for giving them a collective adjustment, and means for simultaneously moving them toward or from operative position.

9. In a cutter for sheet stock, a bed for the stock, a cutter blade, means for yieldingly depressing the blade, means whereby the blade may be moved to operative or inoperative position, means for adjusting said last means, means for varying the cutting angle of the blade, and means whereby the blade and stock may be relatively moved.

10. In a cutter for sheet stock, a plurality of movable cutting blades, means for adjustably mounting said blades by their rear ends in draw cutting position, means for exerting cutting pressure on said blades, means for varying the pressure on the individual blades, and means for limiting the cutting movement of said blades.

11. In a cutter for sheet stock, a plurality of cutting blades, means for adjusting said blades angularly in a plurality of directions, means for exerting cutting pressure on said blades, means for varying the pressure on the individual blades, and means for simultaneously moving said blades to and from cutting position.

12. In a cutter for sheet stock, a plurality of longitudinally and angularly adjustable cutting blades, means for exerting cutting pressure on said blades, means for varying the pressure on the individual blades, means for relatively adjusting the blades, and means for simultaneously moving said blades to and from cutting position.

13. In a cutter for sheet stock, a flat bed for the stock, means for supporting a cutter, means for yieldingly urging the cutter toward cutting position, means for limiting such movement of the cutter, and independent means for rendering the cutter operative or inoperative.

14. In a cutter for sheet stock, a work bed, a cutting element co-operating therewith, means whereby the cutting element may be pivotally mounted, and means whereby the cutting element may be rotatably adjusted on an axis at right angles to its pivotal mounting.

15. In a cutter for sheet stock, a plurality of angularly adjustable and pivotally mounted blades, means for simultaneously moving them to and from cutting position, means for applying cutting pressure to the blades, means for individually varying the pressure on the blades, and means whereby the blades and the material to be cut may be relatively moved.

16. In a cutter for sheet stock, a cutting device comprising a pivotally supported socket, a clamping member removably and rotatably held in said socket, a cutting element adjustably held in said clamping member, and spring means for exerting pressure on the cutting element.

17. In a cutter for sheet stock, a cutting bed for the stock, a carriage adapted to travel thereover, a plurality of cutting elements adjustably mounted on the carriage, and means for tensioning the stock in advance of the cutting elements.

18. In a cutter for sheet stock, a cutting bed for the stock, a carriage adapted to travel thereover, a plurality of cutting elements adjustably mounted on the carriage, adjustable means for exerting cutting pressure on the cutting elements, and means for tensioning the stock in advance of the cutting elements.

19. In a cutter for sheet stock, a bed for the stock, a carriage movable over the bed, a cutter blade pivotally mounted on the carriage, means for yieldingly depressing the blade, means for raising and lowering the blade, and means whereby the angle of engagement of the blade with the stock may be varied.

20. In a cutter for sheet stock, a bed, a carriage movable thereover, a member movably supported transversely therein, means for moving said member toward and from the bed, adjustable means for limiting the movement of the member, and a cutter blade mounted on the member.

21. In a cutter for sheet stock, a bed, a carriage movable thereover, a member movably supported transversely therein, means for moving the member adjustably connected thereto, adjustable means for limiting the movement of the member, a cutter blade mounted on the member, and means for yieldingly urging the blade toward the bed.

22. In a cutter for sheet stock, a carriage, a bar movably supported therein, means for moving the bar, a cutter blade mounted on the bar, means for transversely and longitudinally varying its cutting angle, and means for exerting a yielding cutting pressure on the blade.

23. In a cutter for sheet stock, a bed, a carriage movable thereover, a bar movably supported therein, means for moving the bar, adjustable means for limiting the movement of the bar, a plurality of cutter blades adjustably mounted on the bar, and individual means for exerting cutting pressure on the blades.

24. In a cutter for sheet stock, a bed for the stock, a carriage movable on said bed, a plurality of cutter blades pivotally supported on said carriage, means for adjusting the pivotal support of the blades toward or from the bed, and means for yieldingly holding the blades in engagement with the stock as the carriage is moved over the bed.

25. In a cutter for sheet stock, a bed for the stock, a carriage movable on said bed, a plurality of blades mounted on said carriage and disposed to make a skive cut, means for varying the angle of said skive cut, and means for yieldingly holding the blades in engagement with the stock as the carriage is moved over the bed.

26. In a cutter for sheet stock, a bed for the stock, a carriage, a plurality of cutter blades pivotally carried thereby, means for raising and lowering the pivotal points of the blades, means whereby the blades may be relatively adjusted, means for varying the cutting angle of the blades, means for varying the cutting pressure of the blades, and means for moving the blades to operative or inoperative position.

27. In a cutter for sheet stock, a bed, a carriage movable thereover, a bar movable in said carriage, means for moving the bar to either of two positions, means for adjustably connecting the bar and its moving means, a plurality of cutter blades pivotally mounted on said bar, adjustable means for holding the blades in spaced relation, means for yieldingly depressing the blades, and means for varying the cutting angle of the blades.

28. In a cutter for sheet stock, a bed, a carriage movable thereover, a bar mounted on the carriage and movable toward or from the bed, a rock shaft adjustably connected to the bar, means whereby the rock shaft may be turned, a plurality of cutter blades mounted on the bar, and yielding means for urging them toward the bed.

29. In a cutter for sheet stock, a bed, a carriage movable thereover, a rocking frame mounted on the carriage, stock guiding rolls mounted on said frame, means for locking said frame, and cutting means mounted on the carriage cooperating with said bed and rolls.

Signed at Passaic, N. J., this 16th day of April, 1920.

HENRY Z. COBB.